L. GERHARDT.
PICK-OFF APPARATUS.
APPLICATION FILED MAR. 6, 1920.
1,362,286.
Patented Dec. 14, 1920.
2 SHEETS—SHEET 1.
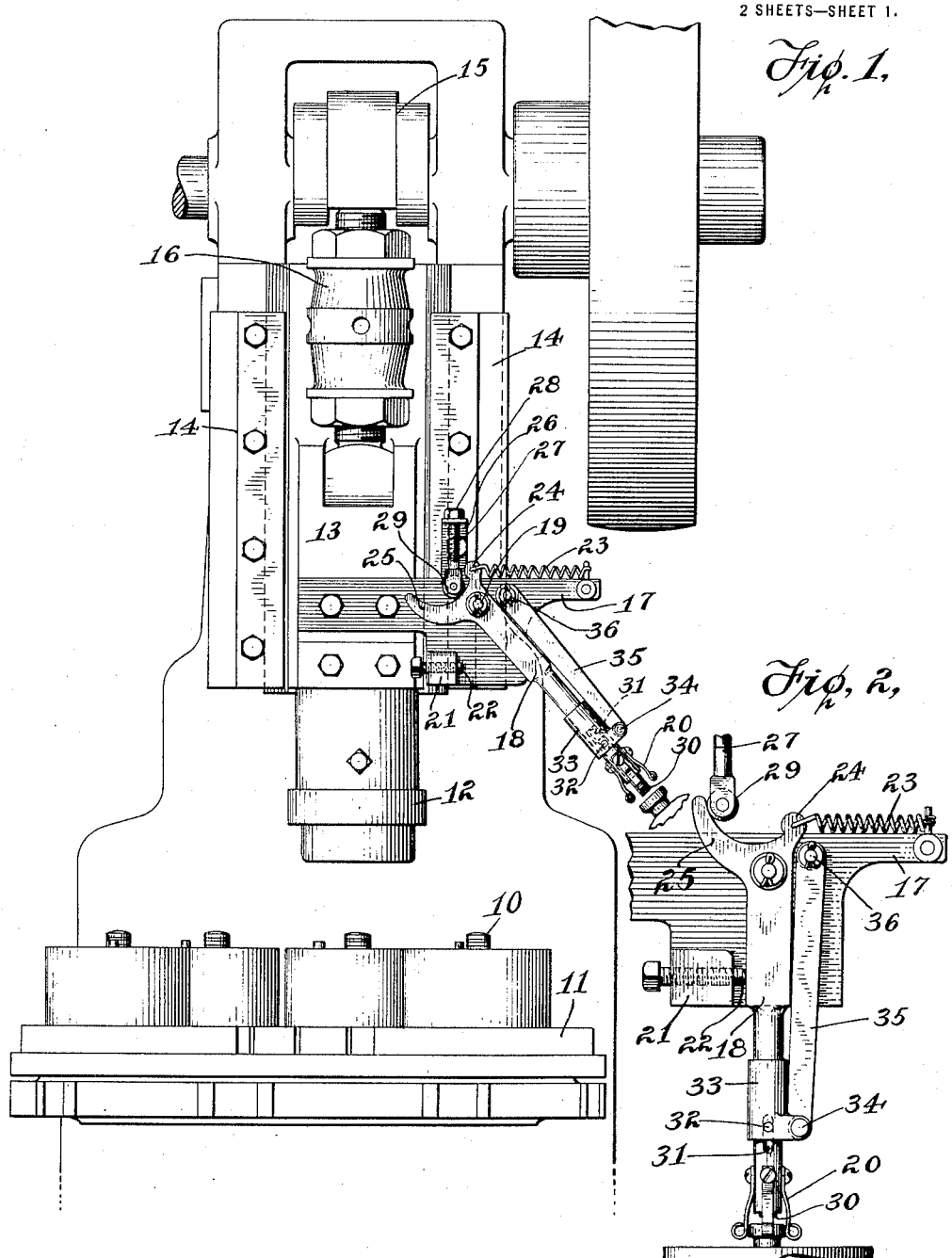
Inventor
Leonard Gerhardt
By his Attorneys
Meyers, Cavanagh & Hyde

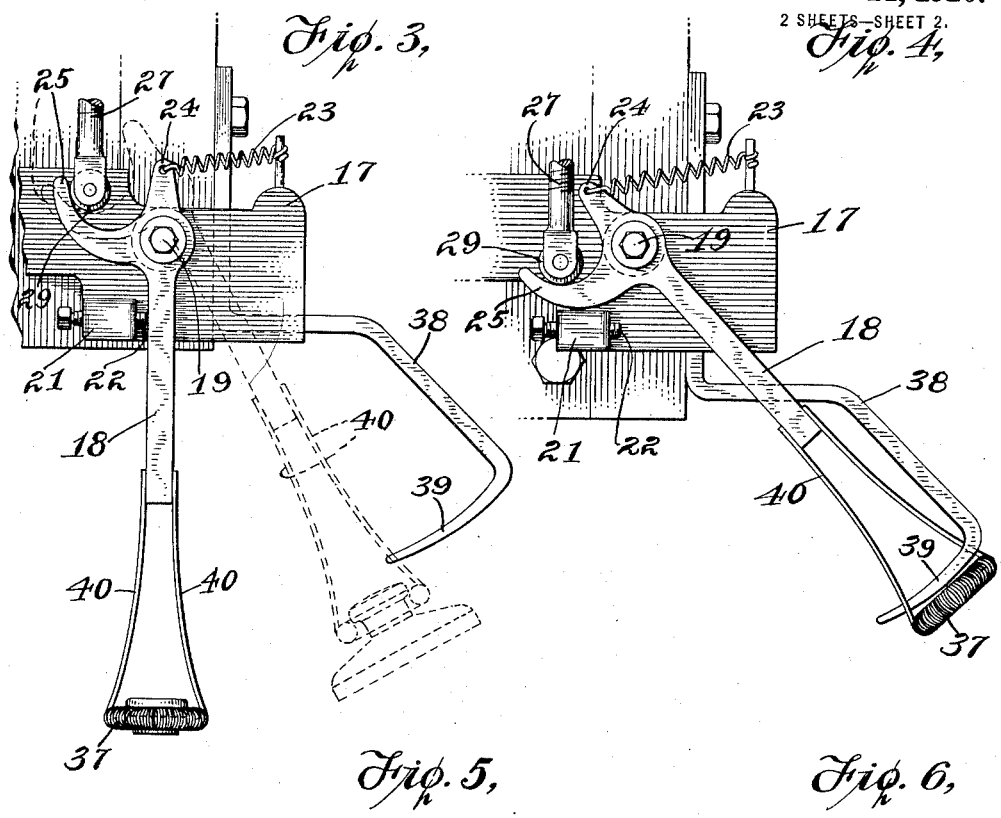
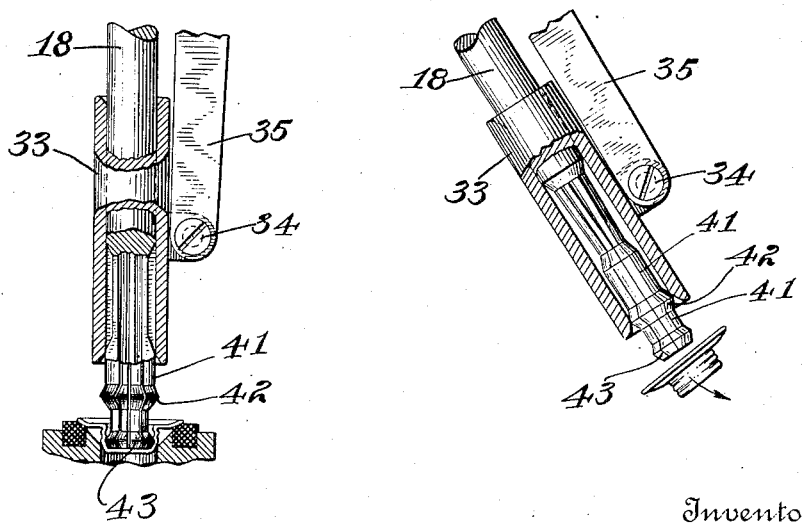

UNITED STATES PATENT OFFICE.

LEONARD GERHARDT, OF BALTIMORE, MARYLAND, ASSIGNOR TO THE TIN DECORATING COMPANY OF BALTIMORE, OF BALTIMORE, MARYLAND, A CORPORATION OF NEW JERSEY.

PICK-OFF APPARATUS.

1,362,286. Specification of Letters Patent. Patented Dec. 14, 1920.

Application filed March 6, 1920. Serial No. 363,890.

*To all whom it may concern:*

Be it known that I, LEONARD GERHARDT, a citizen of the United States, and resident of Baltimore, State of Maryland, have invented certain new and useful Improvements in Pick-Off Apparatus, of which the following is a specification.

My invention relates to devices for ejecting or removing articles from a work support.

In devising automatic machinery for handling a succession of articles, it is frequently necessary to provide apparatus adapted to pick up an article, shift it laterally, and release it. The solution of this problem presents numerous difficulties when the articles are small, and where they must be grasped and removed from the support prior to the lateral shifting, as such conditions preclude the employment of standard forms of conveying apparatus which slide or wipe the articles from their supports.

A primary object of my invention is to provide means for grasping, shifting laterally, and releasing a succession of small articles. My invention is particularly applicable to automatic machines in which each article is mounted on a work support, where it is subjected to one or more operations. I provide means for grasping the article, removing it from the support, shifting it laterally, and discharging it.

A further object of my invention is to devise apparatus for this purpose which is simple, positive, and strong, with a minimum of relatively moving parts.

In the preferred embodiment, my invention is particularly suited for use with automatic machines which present a number of article carrying supports in succession to one or more operating stations, the apparatus embodying my invention being mounted at the discharge station and operating to remove successive articles from their supports and discharge them at a distance from the support path, thus greatly facilitating the continuous operation of the machine.

In the form disclosed, my invention is applied to the type of automatic machine provided with a reciprocating member adapted to perform an operation upon articles carried by suitable work supports and presented successively to the member. With such machines, the apparatus embodying my invention is adapted to descend with the member into engagement with an article already operated on thereby engaging the article and discharging such article laterally during the ascent of the member. This mode of operation assures perfect synchronism between the operating mechanism and the discharge apparatus, and facilitates the provision of an extremely simple discharge device.

Another substantial problem in connection with article handling apparatus is that of providing means for engaging small, irregular articles and removing them from supports which project into or about such articles. I have provided apparatus which is not only extremely simple, but provides positive engagement with and removal of such irregular articles.

A further object is to provide removal mechanism resiliently engaging small, irregular articles to prevent damage thereto.

Other objects and advantages of my invention will be apparent from the following description, taken in connection with the accompanying drawings, in which:

Figure 1 is a front view of one form of my invention applied to a machine,

Fig. 2 is a front view of the same form in article engaging position,

Fig. 3 is a front view of a modified form in article engaging position,

Fig. 4 is a front view of the form shown in Fig. 3, in discharging position,

Fig. 5 is a fragmentary view partly in section of another modified form in article engaging position, and Fig. 6 is a view of this form in discharging position.

For purposes of illustration, I have shown my invention in Fig. 1 as applied to a machine for crimping covers on the necks of sifter top cans, such as is disclosed in application No. 307,261; but it is, apparent that devices embodying my invention may be employed with numerous other types of machines, such as the machine for testing the leakage qualities of blanks, disclosed in my application No. 198,064, of which this application is in part a continuation.

The machine disclosed in Fig. 1 includes a plurality of work supports 10 mounted on a table 11, which is revolved to present each support 10 to a reciprocating crimper 12 mounted on a carriage 13 vertically slidable in the stationary frame 14, a crank 15 connected to carriage 13 by link 16 serving to reciprocate the crimper 12.

The discharge apparatus embodying my invention is mounted in part upon the reciprocating carriage 13, as by providing a plate 17 mounted on the carriage. A swinging arm 18 is pivoted at 19 to plate 17 and is provided at its lower end with article engaging elements. These may include spring fingers 20 extending beyond the end of arm 18 and suitably arranged and proportioned to grasp an article carried by a support 10 when the descent of carriage 13 and plate 17 brings the fingers into engagement with the article.

I preferably provide means for maintaining arm 18 in position where fingers 20 will engage an article on a support 10 upon the descent of the carriage. One arrangement for this purpose includes a stop which may consist of an abutment 21 on plate 17, and a stop screw 22 threaded through the abutment, the end of said screw forming an adjustable stop for arm 18. I may also provide spring means of any preferred form for maintaining arm 18 normally in contact with stop screw 22, a convenient arrangement including a spring 23 connected at one end to an extension 24 of arm 18 beyond pivot 19, the other end of the spring being attached to plate 17.

I provide means for swinging arm 18 to the right during the rise of the carriage 13 to facilitate discharge of the article at one side of the machine. For this purpose, I prefer to provide a cam finger 25 connected to arm 18 and extending beyond pivot 19. I also provide a suitable fixed member or abutment mounted on the frame 14 of the machine, finger 25 being so proportioned and arranged that the abutment will contact therewith during the rise of the carriage, swinging arm 18 about pivot 19 so as to throw the lower end of the arm outwardly.

Any preferred form of abutment may be used. I have disclosed a bracket 26 mounted on the frame 14 and carrying a rod 27 threaded therethrough, and preferably having a lock nut 28 on the upper end thereof. On the lower end of rod 27 is mounted a contact element, such as roller 29, suitably located to engage cam finger 25 during the ascent of the carriage, the upper surface of the finger being suitably contoured so that the engagement thereof with roller 29 will swing arm 18 outwardly, the descent of the carriage serving to return the arm inwardly to normal position. This return, in the form disclosed, is aided by spring 23; but it will be apparent that under proper conditions, the spring may be dispensed with, gravity being sufficient to provide the return; and if desired, the stop screw 22 may also be omitted, finger 25 being suitably contoured to maintain arm 18 in proper position when the carriage is approaching the limit of its descent.

I provide means for discharging an article grasped by fingers 20 while arm 18 is swung outwardly and the carriage is in elevated position. Several forms of apparatus adapted for this purpose have been disclosed herein, and obviously other constructions may be employed. In the form shown best in Fig. 2, I employ an ejector rod 30 longitudinally slidable within the lower end of arm 18 and adapted to be projected beyond said end. To advance and retract ejector rod 30, I may provide a slot 31 in the sides of arm 18 through which a pin 32, connected to rod 30, passes into engagement with a sliding collar 33 pivoted at 34 to one end of link 35, the other end being pivotally mounted at 36 on plate 17. The parts are so proportioned that when arm 18 is in normal position in register with a support 10, rod 30 will be in retracted position, permitting fingers 20 to grasp an article. When the carriage ascends and arm 18 is swung to the right, link 35 will force collar 33 outwardly on arm 18, producing a similar outward motion of ejector rod 30, which will force the article from between fingers 20, leaving it free to fall clear of the machine.

It will be evident that various article engaging means besides fingers 20 may be used. For instance a resilient ring 37, shown in Fig. 3, may be substituted. Furthermore, various types of ejecting elements may be connected to link 35 within the scope of my invention, it being obvious that the lower end of link 35 will swing outwardly along arm 18 as the latter is shifted to the right, providing suitable actuating means for any preferred type of ejector element.

However, my invention is not limited to the employment of link 35 as ejecting means. In the form disclosed in Figs. 3 and 4, I have provided a fixed element adapted to engage an article held at the end of arm 18 and to free the article from said arm when the latter is in outwardly extended position. For this purpose, I may employ an arm 38 mounted on frame 14 and provided with an article engaging portion which may be in the form of finger 39. The parts are so arranged that when the carriage ascends and arm 18 is swung to the right, the combined rise and outward swing of said arm will bring the article held at the lower end thereof upwardly against finger 39, which will force the article out of engagement with arm 18. Any preferred form of article engaging device may be employed in connection with arm 38, the form shown in Fig. 3 including ring 37 mounted on arm 18 by hangers 40.

Another arrangement embodying my invention is shown in Figs. 5 and 6, this form being disclosed in my application No. 198,064. In this arrangement, I employ collar 33 pivoted at 34 to link 35, as in the form shown in Figs. 1 and 2. The end of arm 18, however, carries a plurality of spring sections 41, either integral therewith or connected thereto, the sections being provided with contiguous cam shoulders 42 near the lower end thereof, and, if desired, with article engaging projections 43. Sections 41 are normally in expanded position spaced from each other, this form of device being adapted to engage an article by the outward pressure of sections 41 against the inner walls of the article. It will readily be apprehended that by forcing the lower ends of the sections into the interior of an article, their natural expansion will engage the article; while the outward swing of arm 18 will force collar 33 along said arm into engagement with cam shoulders 42, thus contracting sections 41 and permitting the article to fall therefrom, as shown in Fig. 6.

The operation of the device will be apparent from the preceding description. When carriage 13 descends, crimper 12 will operate upon an article on a support 10, while arm 18, which will be in engagement with stop 22 during the latter part of the carriage descent, will rest directly over a succeeding support 10.- Upon the completion of the carriage descent, the article will be grasped by either fingers 20, ring 37 or sections 41, the resilient character of the article engaging elements permitting them to slide outwardly or inwardly over the article into enga ng position. In the form disclosed, as the supports 10 are relatively vertical, it is desirab that the article be raised perpendicularly a short distance before swinging outwardly, this object being readily accomplished by suitably proportioning cam finger 25 and locating roller 29 accordingly. The continued rise of the carriage will bring the roller into engagement with said cam finger 25, throwing arm 18 outwardly and ejecting the article therefrom in the manner already indicated. During the rise of the carriage, the table 11 is rotated to bring a succeeding support into register with crimping head 12, the article upon which said head has just operated being shifted into register with the discharge mechanism.

It will be apparent that I have provided a device adapted to rapid operation, extremely simple in construction, having a small number of moving parts, and adapted to engage irregular articles without slipping or marring. Furthermore, I have disclosed a specific arrangement which may readily be mounted upon standard machines without alterations therein.

While I have described my device as applied to continuously operating automatic machines, it will be apparent that it is not limited to such use, and may be employed to remove articles from a stationary work support. Moreover, while it is especially adapted for automatic operation in connection with a reciprocating member, it will be evident that my device is not limited to use with such a reciprocating member.

Although I have described the preferred form of my invention and several modifications thereof, it will be apparent that many other changes therein may be made within the scope of my invention as set forth in this specification.

I claim:

1. In an article handling device, an article support, means movable in opposite directions operative during the successive movements in one direction for engaging the articles and operative during the successive movements in the opposite direction for removing the articles from the support, and means operative only during the movements in the opposite direction for engaging and ejecting the articles from the first mentioned means.

2. In an article handling device, an article support, reciprocable means operative during the successive movements in one direction for engaging the articles and operative during the successive movements in the opposite direction for removing the articles from the support, and means operative only during a predetermined portion of the movements in the opposite direction for engaging and ejecting the articles from the first mentioned means.

3. In an article handling device, an article support, vertically reciprocable means operative during the descent for engaging the articles and operative during the ascent for lifting the articles from the support, and means operative only during the ascent of said reciprocable means for engaging and ejecting laterally the articles from the reciprocable means.

4. In an article handling device, an article support, reciprocable means for operating on the articles on said support, discharging means movable with said reciprocable means in opposite directions for engaging an article while moving in one direction and removing the article from the support while moving in the opposite direction, and means operative only during the movements in the opposite direction for engaging and ejecting the articles.

5. In an article handling device, an article support, reciprocable means for operating on the articles on said support, discharging means mounted on and movable with said reciprocable means in opposite directions for engaging an article while moving in one direction and removing the article from the support while moving in the opposite direction, and means operative only during the movements in the opposite direction for engaging and ejecting the articles, 6. An attachment to a crimping machine comprising a support adapted to be mounted on the reciprocating crimping head, discharging means mounted on said support for engaging and removing the crimped articles during reciprocation of the support, and ejecting means operative only for engaging and ejecting the articles during alternate movements of the said support.

7. In an article handling machine, an article support, oscillatable means movable toward and away from said support operative in successive movements in one direction for engaging the articles on the support and operative in successive movements in the opposite direction for removing and discharging the articles, and means for oscillating said first mentioned means.

8. In an article handling machine, an article support, oscillatable means reciprocable toward and away from said support, operative in successive movements in one direction for engaging the articles on the support and operative in successive movements in the opposite direction for removing and discharging the articles, and means for oscillating said first mentioned means.

9. In an article handling machine, an article support, oscillatable reciprocable means operative for engaging the articles on the support at each reciprocation in one direction thereof, means for ejecting the articles from said reciprocable means, and means for oscillating said first mentioned means to render the ejecting means operative.

10. In an article handling device, an article support, oscillatable vertically reciprocable means operative during its descent for engaging the articles and operative during its ascent for lifting the articles from the support, means operative only during the ascent of said reciprocable means for engaging and ejecting laterally the article from the first mentioned means, and means for oscillating said first mentioned means to render the ejecting means operative.

11. In an article handling device, an article support, reciprocable means operating on the articles on said support when in operating position, discharging means comprising an oscillatable member reciprocably movable with said reciprocable means for removing and discharging the articles when on said support in discharging position, and means for oscillating said member.

12. In an article handling device, an article support, reciprocable means for operating on the articles on said support when in operating position, discharging means comprising an oscillatable member mounted on said reciprocable means for removing and discharging the articles when on said support in discharging position, and means for oscillating said member.

13. In an article handling device, an article support, vertically reciprocable means for operating on the articles on said support while in operating position, provisions mounted on said reciprocable means operative during the descent of said means for engaging the articles while in discharging position and operative during the ascent of said means for removing from the support and discharging the articles, said provisions including an oscillatable member and means for oscillating said member to effect the discharging operation.

14. An attachment to a crimping machine comprising a support adapted to be mounted on the reciprocating crimping head, an oscillatable member mounted on said support to reciprocate therewith, operative during movement in one direction for engaging articles and operative during movement in the opposite direction for removing and discharging said articles, and means adapted to be mounted on a stationary part of the crimping machine for oscillating said member for effecting the discharging operation.

15. In article handling apparatus, an article support, a reciprocating member located above the support, an element pivotally mounted on said member and reciprocating therewith, article engaging means carried by said element, means for oscillating said element about its pivot adapted to swing the engaging means into position to engage an article carried by said article support during the descent of the member and to shift said engaging means and article carried thereby laterally into discharging position during the rise of said member, and means for releasing said article from the engaging means when the oscillating element arrives at discharging position.

16. In article handling apparatus, an article support, a reciprocating member located above the support, an element pivotally mounted on said member and reciprocating therewith, article engaging means carried by said element, a fixed support, mean connected to said fixed support for oscillating said element about its pivot adapted to swing the engaging means into position to engage an article carried by said article support during the descent of the member and to shift said engaging means and an article carried thereby laterally into discharging position during the rise of said member, and means for releasing said article from the engaging means when the oscillating element arrives at discharging position.

17. In article handling apparatus, an article support adapted to be shifted successively into operating and discharging positions, a reciprocating operating member adapted to operate during its descending motion upon an article carried by said support in operating position, an element pivotally mounted on said member and reciprocating therewith, article engaging means carried by said element, means for oscillating said element about its pivot adapted to swing the engaging means into position to engage an article carried by said article support during the descent of the member and to shift said engaging means and article carried thereby laterally into discharging position during the rise of said member, and means for releasing said article from the engaging means when the oscillating element arrives at discharging position.

18. In article handling apparatus, an article support adapted to be shifted successively into operating and discharging positions, a reciprocating operating member adapted to operate during its descending motion upon an article carried by said support in operating position, an element pivotally mounted on said member and reciprocating therewith, resilient article engaging means carried by said element, means for oscillating said element about its pivot adapted to swing the engaging means into position to frictionally engage an article carried by said article support during the descent of the member and to shift said engaging means and article carried thereby laterally into discharging position during the rise of said member, and means for releasing said article from the engaging means when the oscillating element arrives at discharging position.

Signed at Baltimore, State of Maryland, this 1st day of March, A. D. 1920.

LEONARD GERHARDT.